United States Patent [19]
Kitaura et al.

[11] Patent Number: 5,477,278
[45] Date of Patent: Dec. 19, 1995

[54] APPARATUS FOR DETECTING MOTION OF MOVING PICTURE

[75] Inventors: Aoi Kitaura, Tenri; Naoyuki Fukuda, Nara, both of Japan

[73] Assignee: Sharp Kabushiki Kaisha, Osaka, Japan

[21] Appl. No.: 273,906

[22] Filed: Jul. 12, 1994

Related U.S. Application Data

[63] Continuation-in-part of Ser. No. 992,760, Dec. 18, 1992, abandoned.

[30] Foreign Application Priority Data

Dec. 24, 1991 [JP] Japan .................. 3-340944

[51] Int. Cl.[6] ................................. H04N 7/36
[52] U.S. Cl. ........................................ 348/699
[58] Field of Search .................. 348/699, 413, 348/416; H04N 7/36

[56] References Cited

U.S. PATENT DOCUMENTS 4,864,398  9/1989  Avis et al. .................. 348/699
5,027,205  6/1991  Avis et al. .................. 348/699

OTHER PUBLICATIONS

Hiroshi Fujiwara et al, "Chip–set for High Efficient Coding of Motion Pictures Developed", Nikkei Electronics, No. 503, Jun. 25, 1990, pp. 209–222, published in Tokyo, Japan.
Teresa H. Y. Meng and Andy C. Hung, "Parallel Array Architectures for Motion Estimation", Int. Conf. on Application Specific Array Processors, Sep. 1991, IEEE, pp. 214–235.

*Primary Examiner*—Howard W. Britton

[57] ABSTRACT

An apparatus for detecting a motion of an image includes a first unit for calculating first partial accumulates of one block, a second unit for calculating second partial accumulates about candidate value of first partial accumulates selected in order from the smallest value and for storing total accumulates which are sums with the first and second partial accumulates, a unit for selecting a minimum total accumulate from the total accumulates stored in the second unit and for outputting the minimum total accumulate together with a location coordinate corresponding to the minimum total accumulate.

12 Claims, 20 Drawing Sheets

1

APPARATUS FOR DETECTING MOTION OF MOVING PICTURE

CROSS-REFERENCE TO RELATED APPLICATION

This application is a Continuation-In-Part application of, and claims priority from U.S. patent application Ser. No. 07/992,760 entitled "Apparatus for Detecting Motion of Moving Picture" filed on Dec. 18, 1992, abandoned.

BACKGROUND OF THE INVENTION

1. Field of the Invention

The present invention relates to an apparatus for detecting a motion of an image which may apply to a technique for compressing a moving picture.

2. Description of the Related Art

The inventors of the present invention know that a pattern matching technique has been widely studied for a practical use of searching a motion vector. The pattern matching technique is arranged to derive an accumulate $D_{i,j}$ of each coordinate (i, j) in the searching range between two pixel signal intensities $X_{m,n}$ and $Y_{m,n}$ of M×N pixels located between two frames contained in a two-dimensional image. For deriving the accumulate $D_{i,j}$, the following expression (1) can be used.

$$D_{i,j} = \sum_{m=1}^{M} \sum_{n=1}^{N} |X_{m,n} - Y_{m+i,n+j}| \quad (1)$$

Then, as shown in FIG. 1, a minimum value is selected among the accumulates $D_{i,j}$ derived by the expression (1) and is output as a motion vector (consisting of a spatial location and a value). Next, assuming that a block to be searched is M×N and the searching range is L, as shown in FIG. 2, an absolute value of a difference between the block to be searched and the motion vector is calculated about a (M, N) pixel {(M×N)×L} times.

SUMMARY OF THE INVENTION

It is an object of the present invention to provide an apparatus for detecting a motion of an image which is capable of reducing the difference absolute value of additions when obtaining a motion vector.

The object of the present invention can be achieved by an apparatus for detecting a motion of an image includes a first unit for calculating first partial accumulates of one block, a second unit for calculating second partial accumulates about candidate coordinates and for storing total accumulates which are sums with the first and second partial accumulates, a unit for selecting a minimum total accumulate from the total accumulates stored in the second calculating unit and for outputting the minimum total accumulate together with a location coordinate corresponding to the minimum total accumulate.

Preferably, the apparatus is so arranged that pixel values corresponding to blocks to be searched in a searching range are sequentially compared with each other for obtaining motion vectors of two or more pixels between frames of the image.

More preferably, the apparatus is so arranged that the location coordinate having the minimum accumulate is set as a motion vector.

Further preferably, the first calculating unit is so arranged that a number of calculations of partial accumulates to be performed is (M×N)/A, the M×N representing numbers of pixels in the one block and the A representing a high-speed operation coefficient.

The second calculating unit is so arranged that a number of calculations of accumulates to be performed is {1−(1/A)}×M×N, the M×N representing numbers of pixels in the one block and the A representing a high speed operation coefficient.

Each of the total accumulates corresponds to a sum of any one of the accumulates and any one of the partial accumulates.

In operation, the apparatus for detecting a motion of an image (referring to a detector, hereinafter) operates to use a coefficient for speeding up an operation for reducing the calculation times of partial accumulates for one block each consisting of M by N pixels. Then, the detector performs an operation for deriving an accumulate {1−(1/A)}×M×N times about each of motion vectors having smaller partial accumulates and stores a sum of the partial accumulates and the accumulates as a total accumulate for each motion vector. Next, the detector finds the minimum one of all the total accumulates stored therein and outputs the minimum one and the motion vector corresponding to it. For obtaining motion vectors of two or more pixels located between the frames of the image, the detector sequentially compares the pixels in the block to be searched for deriving the minimum accumulate among the motion vectors for those pixels.

This results in reducing the amount of calculations, thereby enhancing the efficiency of detecting a motion vector of an image.

The object of the present invention can be achieved by an apparatus for detecting a motion vector of a moving picture includes a buffer memory for storing a pixel block of a current frame and a corresponding pixel block of a reference frame, a processor element for deriving partial accumulates between the corresponding pixels of the frames input from the buffer memory and storing the partial accumulates, and a first comparator for comparing and selecting predetermined accumulates stored in the processor element in order from the smallest value.

The apparatus further includes a random access memory for storing the selected first accumulates and spatial locations corresponding to the selected accumulates.

The apparatus further includes an adding circuit connected to the processor element and the random access memory, for receiving the partial accumulates from the processor element and the accumulates from the random access memory and adding the corresponding ones to each other for deriving total accumulates.

The apparatus further includes a second comparator for comparing the total accumulates for selecting a minimum total accumulate and assuming a spatial location at the selected accumulate as a motion vector.

In operation of the apparatus for detecting a motion vector of a moving picture, the buffer memory stores a pixel block of a current frame and corresponding pixel block of a reference frame, the processor element derives partial accumulates between the corresponding Pixels of the frames input from the buffer memory and stores the partial accumulates, and the first comparator compares and selects predetermined accumulates stored in the Processor element in order from the smallest value. The random access memory stores the selected first accumulates and spatial locations corresponding to the selected accumulates. The adding circuit connected to the processor element and the random access memory receives the partial accumulates from the processor element and the accumulates from the random access memory and adds the corresponding ones to each other for deriving total accumulates. The second comparator compares the total accumulates for selecting a minimum total accumulate and assumes a spatial location at the selected accumulate as a motion vector.

This results in reducing the amount of calculations, thereby enhancing the efficiency of detecting a motion vector of a moving picture.

Further objects and advantages of the present invention will be apparent from the following description of the preferred embodiments of the invention as illustrated in the accompanying drawings.

DESCRIPTION OF THE PREFERRED EMBODIMENTS

Referring to the accompanying drawings, an embodiment of an apparatus for detecting a motion vector of a moving picture according to the present invention.

Figure 1:
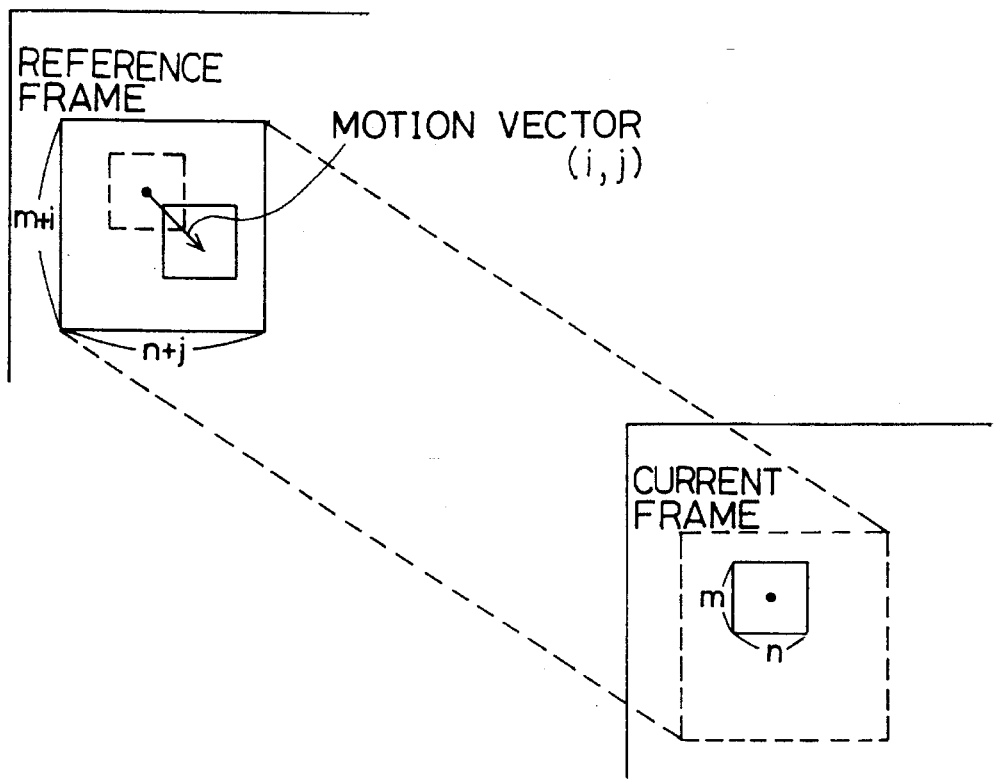
FIG. 1 is an explanatory view showing a process for detecting a motion vector according to the known technique for detecting a motion vector.
Figure 2:
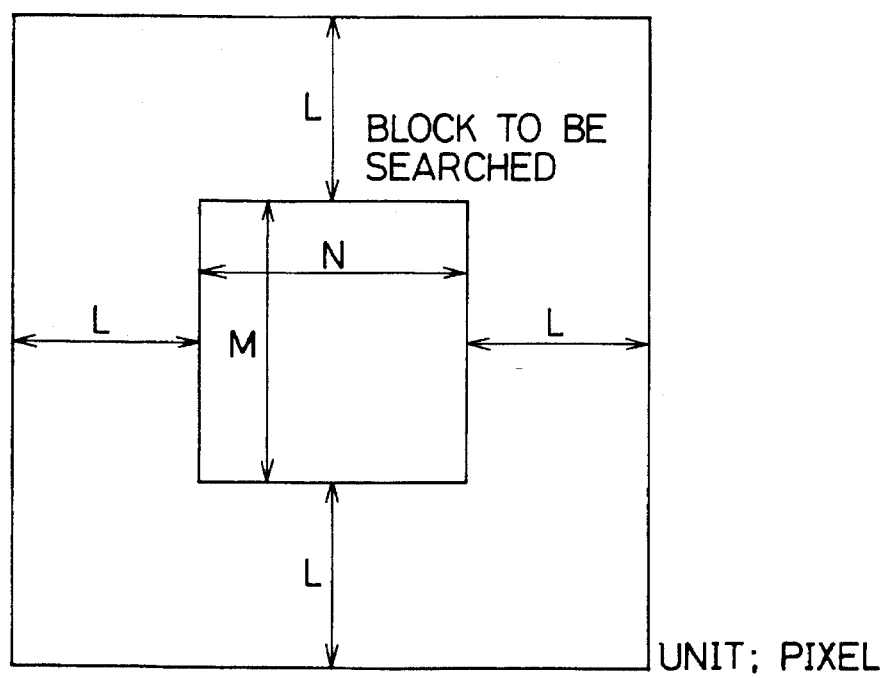
FIG. 2 is an explanatory view showing a retrieving range used in the known technique.
Figure 3:
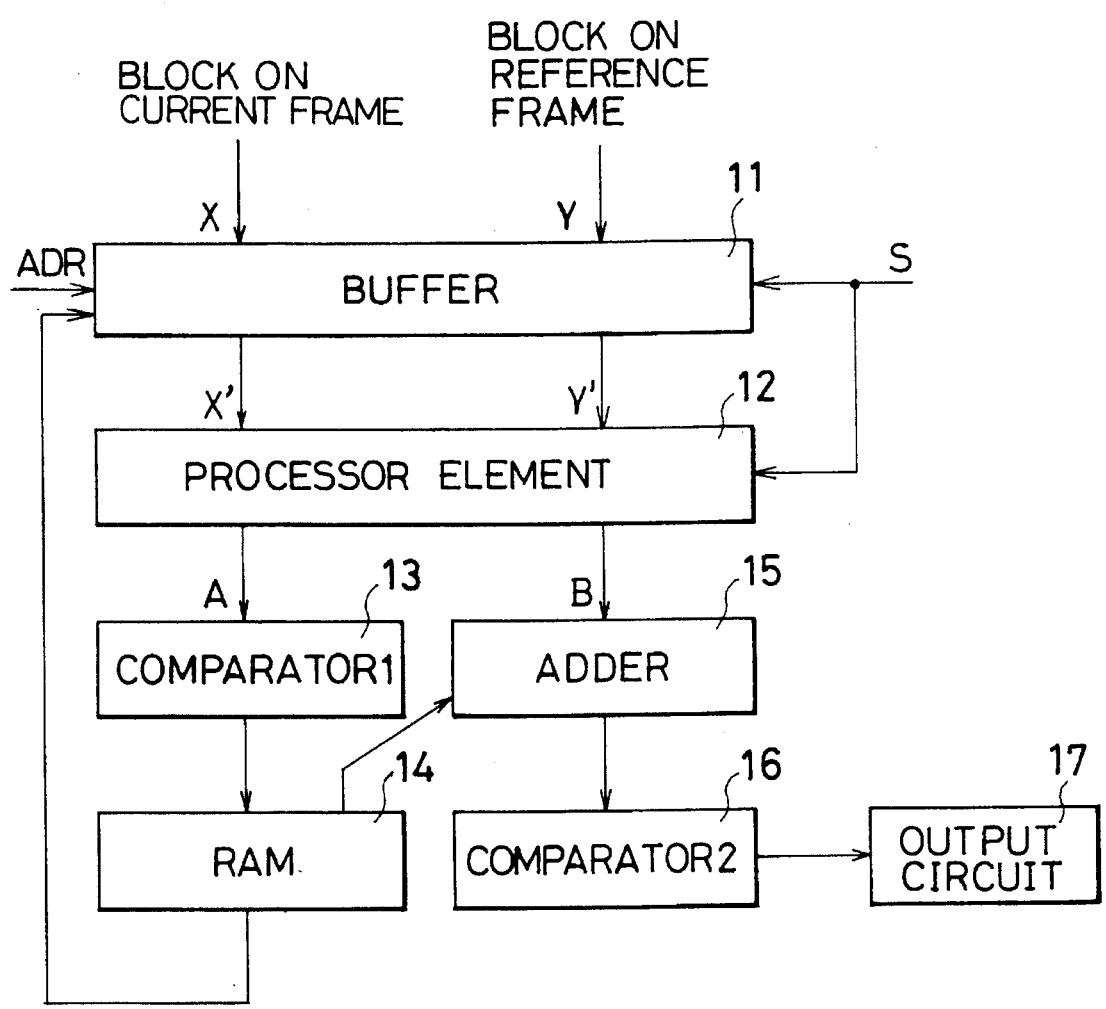
FIG. 3 is a block diagram showing a detector for a motion vector according to an embodiment of the invention.

FIG. 3 is a block diagram showing a detector for a motion vector (referred to as a motion vector detector) according to this embodiment As shown in FIG. 3, the a motion vector detector is arranged to have a buffer memory 11, a processor element 12 connected to the buffer memory 11, a first comparator 13 connected to the processor element 12, a random access memory (RAM) 14 connected to the comparator 13 and the buffer memory 11, an adder 15 connected to the processor element 12 and the RAM 14, a second comparator 16 connected to the processor element 12 and the RAM 14, and an output circuit 17 connected to the second comparator 16.

Next, the operation of each component will be described below.

The buffer memory 11 stores a pixel block X of the current frame and a pixel block Y of the reference frame. As shown in FIG. 3, pixel data X' in the pixel block X and pixel data Y' in the pixel block Y are inputted from the buffer memory 11 to the processor element 12 in accordance with a select signal S.

Figure 4:
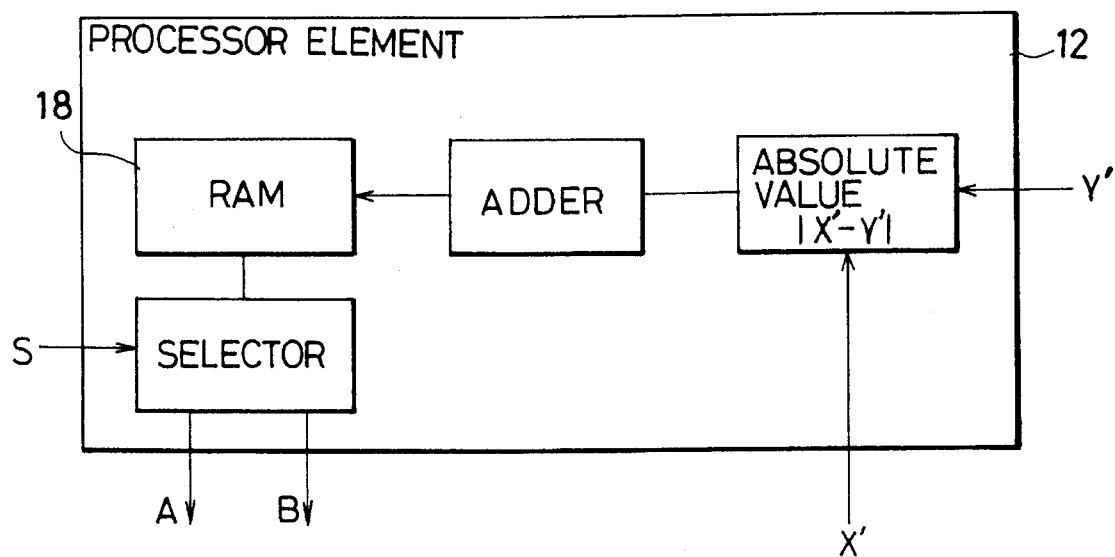
FIG. 4 is a block diagram showing a processor element included in the detector shown in FIG. 3.

As shown in FIG. 4, the processor element 12 performs an operation of deriving first partial accumulates, and also performs an operation of deriving second partial accumulates between the pixel data X' of the current frame and the pixel data Y' of the reference frame. The processor element 12 stores the first partial accumulates and the second partial accumulates in a built-in RAM 18 and outputs the first partial accumulates (A) or the second partial accumulates (B) in accordance with the select signal S.

Next, as shown in FIG. 3, each pixel data corresponding to K spatial locations stored in the buffer memory 11 and stores the derived second partial accumulates. The first comparator 13 selects the K first partial accumulates stored in the processor element 12 in order from the smallest value.

The RAM 14 stores K first partial accumulates obtained in the first comparator 13 and their spatial locations. The adder 15 performs an addition of one first partial accumulate stored in the processor element 12 and the corresponding second partial accumulate stored in the RAM 14 and stores the added value in a built-in RAM 18 (FIG. 4). Then, the second comparator 16 serves to select the minimum value of the K total accumulates stored in the adder 15 and the output circuit 17 supplies the spatial location of the minimum total accumulate as a motion vector.

In turn, the operation of the a motion vector detector shown in FIG. 3 will be described as referring to the flowchart of FIG. 5.

Figure 6:
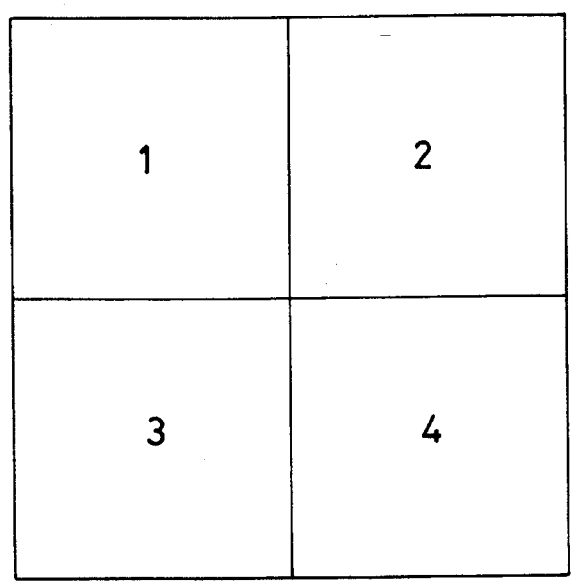
FIG. 6 is an explanatory view showing four blocks in 2 by 2 pixels.

For making the description simpler and easier to understand, as shown in FIG. 6, a picture to be retrieved is divided into small blocks, each block consisting of 2 by 2 pixels, that is, four pixels. For each small block as one unit, the ways how to define the pixels to be calculated and reduce the number of calculations is considered later.

At first, assuming a coefficient a for speeding up an operation (operation speed-up coefficient) as $\alpha=2$. The coefficient $\alpha$ defines a pixel to be distance-derived as follows.

1) $\alpha=1$ pixel 1 (A=4)

2) $\alpha=2$ pixel 1, 2 (A=2)

3) $\alpha=3$ pixel 1, 3 (A=2)

4) α=4 pixel 1, 4 (A=2)
where the operation speed-up coefficient α is assumed as α=2 and thus the high-speed operation coefficient A is set as A=2.

Figure 5:
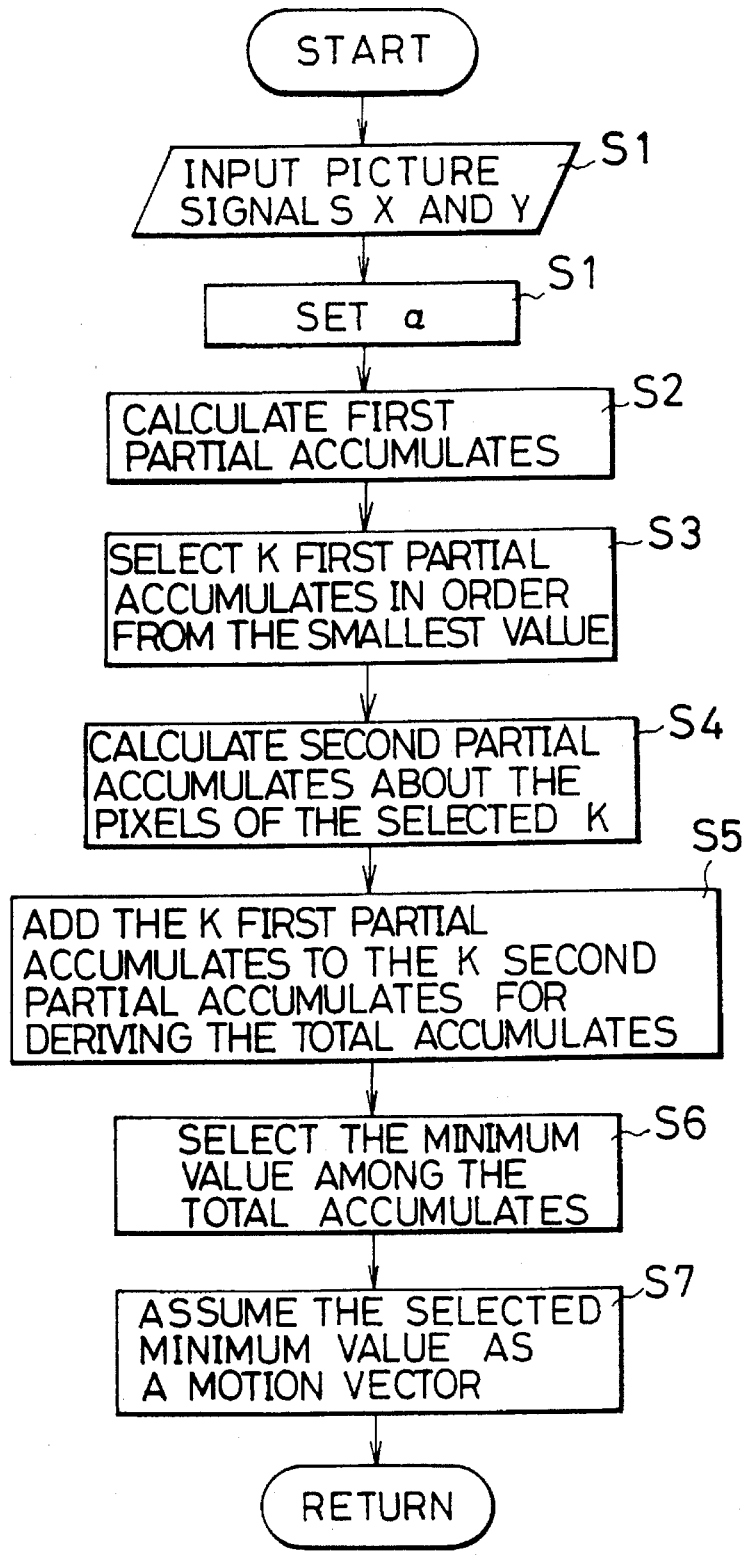
FIG. 5 is a flowchart for describing the operation of the detector for a motion vector shown in FIG. 3.

Turning to FIG. 5, the pixel block Xm, n of the input screen (current frame) and the pixel block Ym, n of the reference screen (reference frame) in the searching range are input to the processor element 12 (step S1). The first partial accumulates $D'_{i,j}$ is derived by the following expression (2) (step S2).

$$D'_{i,j} = \sum_{m=1}^{M/A} \sum_{n=1}^{N} |X_{Am,n} - Y_{Am+i,n+j}| \quad (2)$$

where if A=2 is substituted, it means that the operation is performed with respect to the even lines inside of the block.

The first partial accumulates obtained at the step S2 are stored in the RAM 18 built in the processor element 12. From those first partial accumulates, the operation is performed to select K values from those. first partial accumulates in order from the smallest value and the candidate coordinates of the K motion vectors corresponding to them (step S3).

With respect to each of the candidate coordinates stored in the RAM 14, the second partial accumulate $D''_{i,j}$ is derived by the following expression (3) (step S4).

$$D''_{i,j} = \sum_{k=2}^{A} \sum_{m=1}^{M/A} \sum_{n=1}^{N} |X_{Am-(k-1),n} - Y_{Am-(k-1)+i,n+j}| \quad (3)$$

where if A=2 is substituted, it means that the operation is performed about the odd lines inside of the block.

The first partial accumulate (obtained at the step S3) stored in the RAM 14 is added to the second partial accumulate (obtained at the step S4) stored in the RAM 18 built in the processor element 12 based on the following expression (4) in a manner to correspond the coordinates of both of the first partial accumulates and the second partial accumulates to each other (step S5).

$$D'_{i,j} + D''_{i,j} \quad (4)$$

Then, the operation is performed to select the minimum value of the total accumulates about K candidate coordinates (obtained at the step S5) stored in the RAM 18 built in the adder 15 (step S6). At a time, the spatial coordinate for the selected total accumulative value is derived (step S6).

As such, assuming that the input pixel block consists of M by N pixels, the searching range is L, the high-speed operation coefficient is A, and the number of candidate coordinates about a motion vector needed for first accumulate calculation is K, the amount of calculations consumed in detecting a motion vector needs $$\{L \times (1/A) \times M \times N) + [(A-1) \times K \times \{1-(1/A) \times M \times N\}] = (M \times N)/A \times \{L + K \times (A-1)^2\}$$

It is made smaller in number than the amount of calculations of L×M×N derived by the known technique.

For example, if M×N is 8×8, L is 16×16, A is 2 and K is 10, the a motion vector detector according to the invention consumes only 8512 calculations, while the known technique has consumed as many calculations as 16382. It means that the detector of the invention needs half of the calculations needed by the known technique for implementing the detection of a motion vector.

Next, another embodiment of the present invention is described with reference to accompanying drawings.

Figure 7:
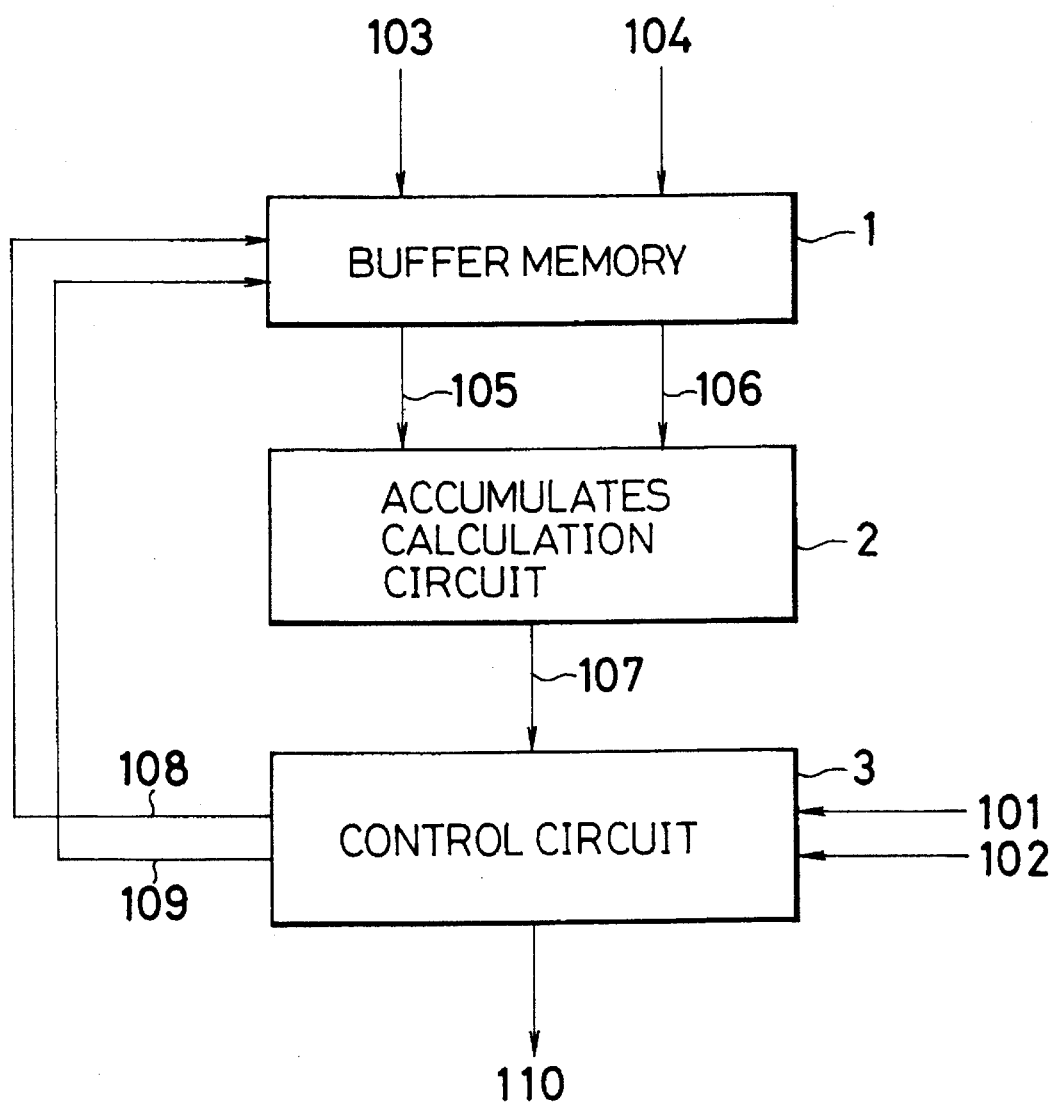
FIG. 7 is a block diagram showing a detector for a motion vector according to another embodiment of the invention.

FIG. 7 is a block diagram showing a motion vector detector according to another embodiment.

As shown in FIG. 7, the motion vector detector is arranged to have buffer memory 1, an accumulates calculation circuit 2 connected to buffer memory 1, and a control circuit 3 connected to the accumulates calculation circuit 2. The detector sequentially compares pixel values corresponding to blocks to be searched for from a search range to find the minimum accumulate, and obtains motion vectors of two or more pixels between frames of an image.

Next, the operation of each component is described below.

Figure 8:
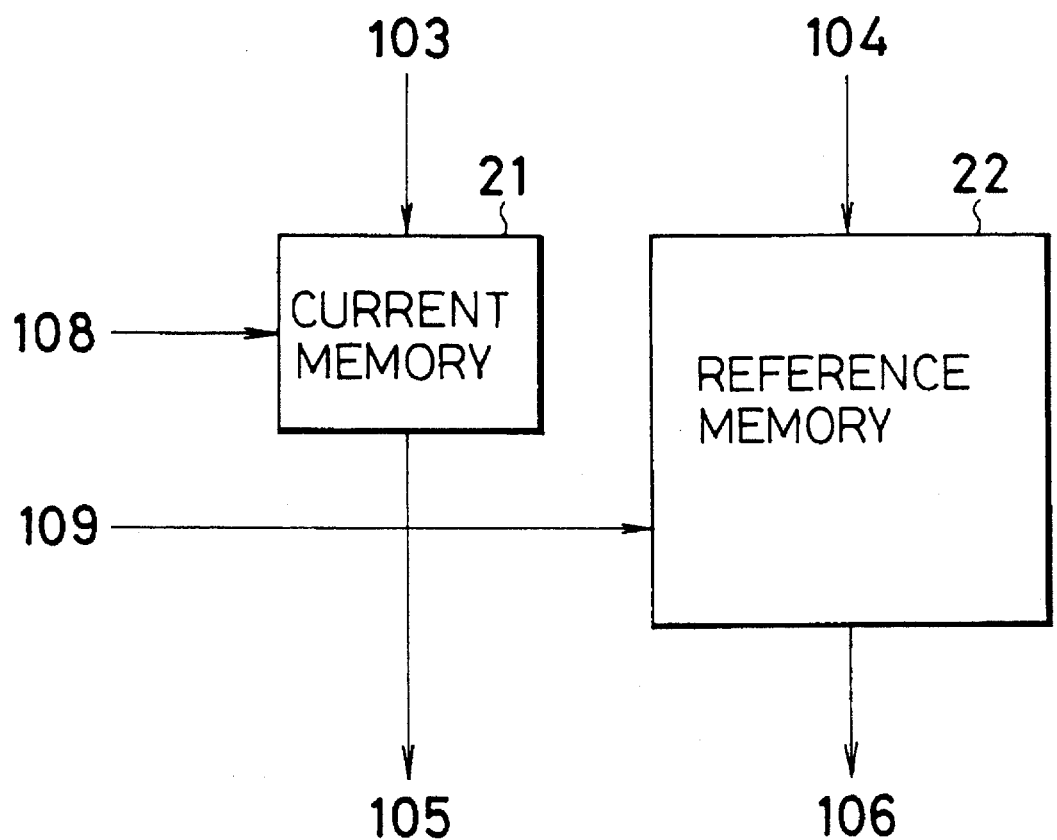
FIG. 8 is a block diagram showing a configuration of the buffer memory 1 in FIG. 7.

FIG. 8 shows a configuration of buffer memory 1.

Buffer memory 1 consists of current memory 21 and reference memory 22. It uses addresses 108, 109 input from the control circuit to output to the accumulates calculation circuit 2 pixel data 105 of the searched for block from current memory 21, and pixel data 106 of the search range from reference memory 22.

Figure 9:
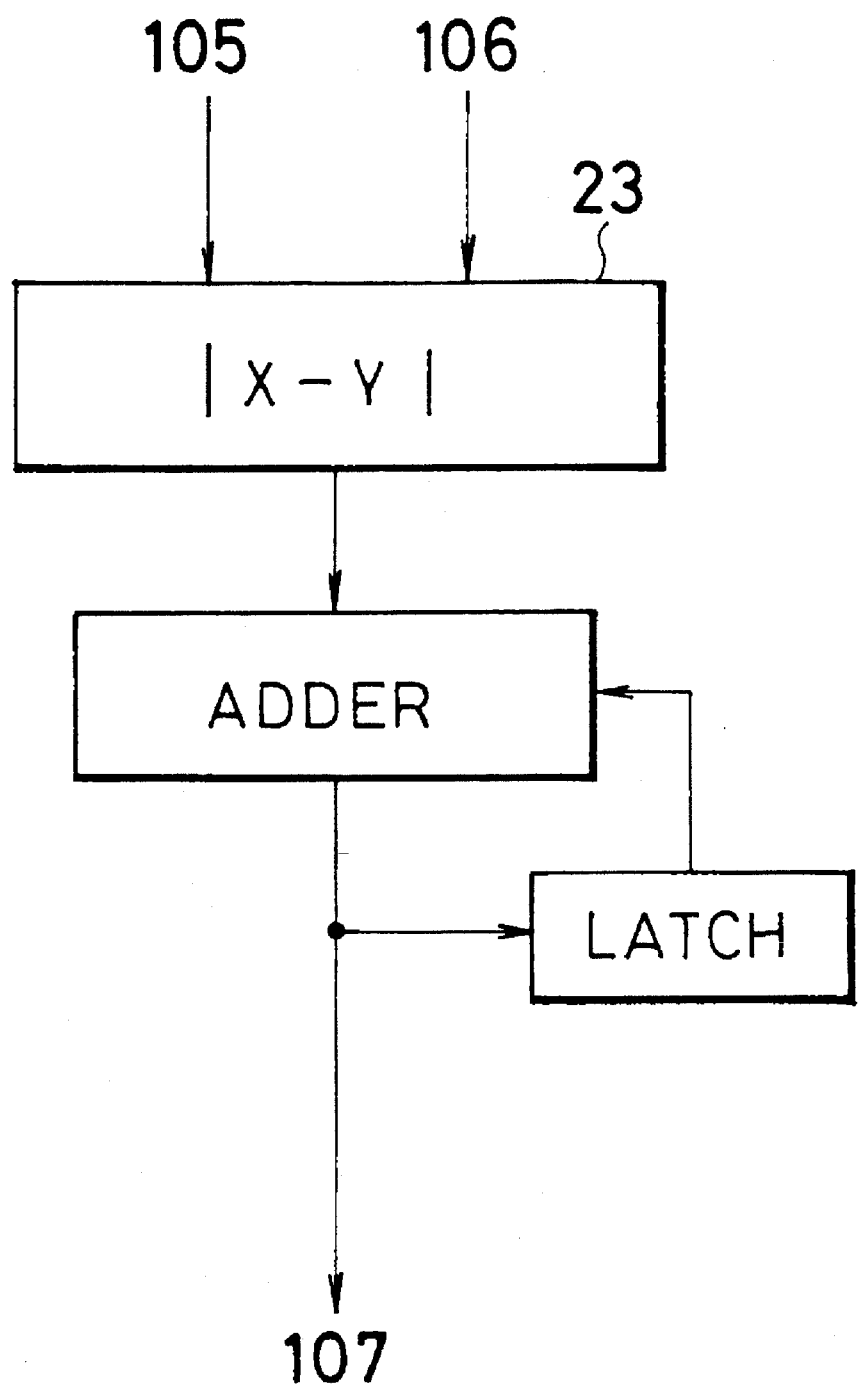
FIG. 9 is a block diagram showing a configuration of the accumulates calculation circuit 12 in FIG. 7.

FIG. 9 shows a configuration of the accumulates calculation circuit 2.

The accumulates calculation circuit 2 consists of an absolute difference computing unit 23, and an adder. It calculates an absolute difference accumulate between search range pixel data 105 and searched block pixel data 106 input from buffer memory 1, and outputs an accumulate 107 to the control circuit 3.

Figure 10:
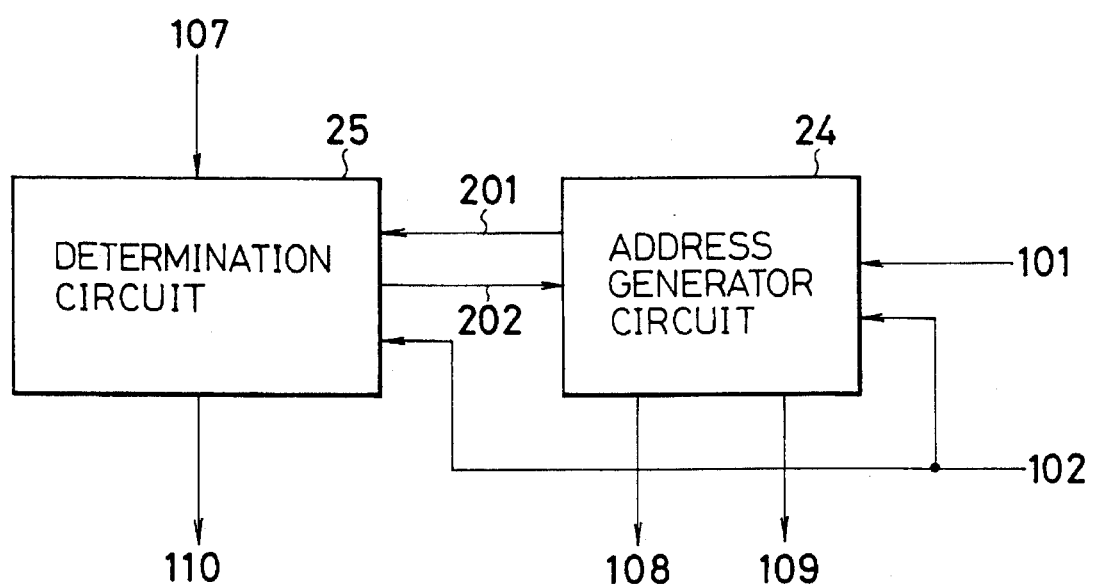
FIG. 10 is a block diagram showing a configuration of the control circuit 3 in FIG. 7.

FIG. 10 shows a configuration of the control circuit 3.

The control circuit 3 consists of an address generator circuit 24 and a determination circuit 25. The address generator circuit 24 outputs addresses 108, 109 to buffer memory 1 and all motion vector candidates 201 to the determination circuit 25. The determination circuit 25 outputs the motion vector 110 and K motion vector candidates 202 to the address generator circuit 24.

Figure 11:
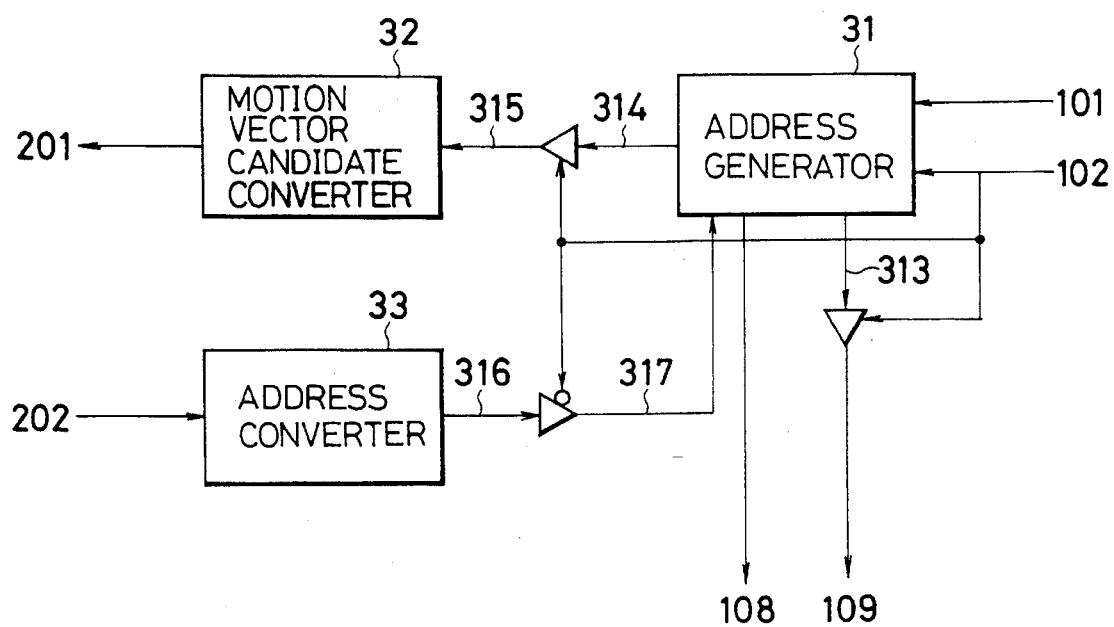
FIG. 11 is a block diagram showing a configuration of the address generator circuit 24 in FIG. 10.

FIG. 11 shows a configuration of the address generator circuit 24.

The address generator circuit 24 consists of an address generator 31, a motion vector candidate converter 32, and an address converter 33. The address generator 31 outputs addresses 108, 313, 314 based on an operation speed-up coefficient 101 externally input and a select signal 102, or K addresses 317 input from the address converter 33. The address 108 is output to buffer memory, the address 313 is output to buffer memory 1 as the address 109 by the select signal 102, and the address 314 is output to the motion vector candidate converter 32 as an address 315. The motion vector candidate converter 32 converts the address 315 to a motion vector candidate (value of spatial position) 201, and outputs it to the determination circuit 25. The address converter 33 converts the motion vector candidate 202 input from the determination circuit 25 to an address 316. The address 316 is output to the address generator 31 as an address 317 by the select signal 102.

Figure 12:
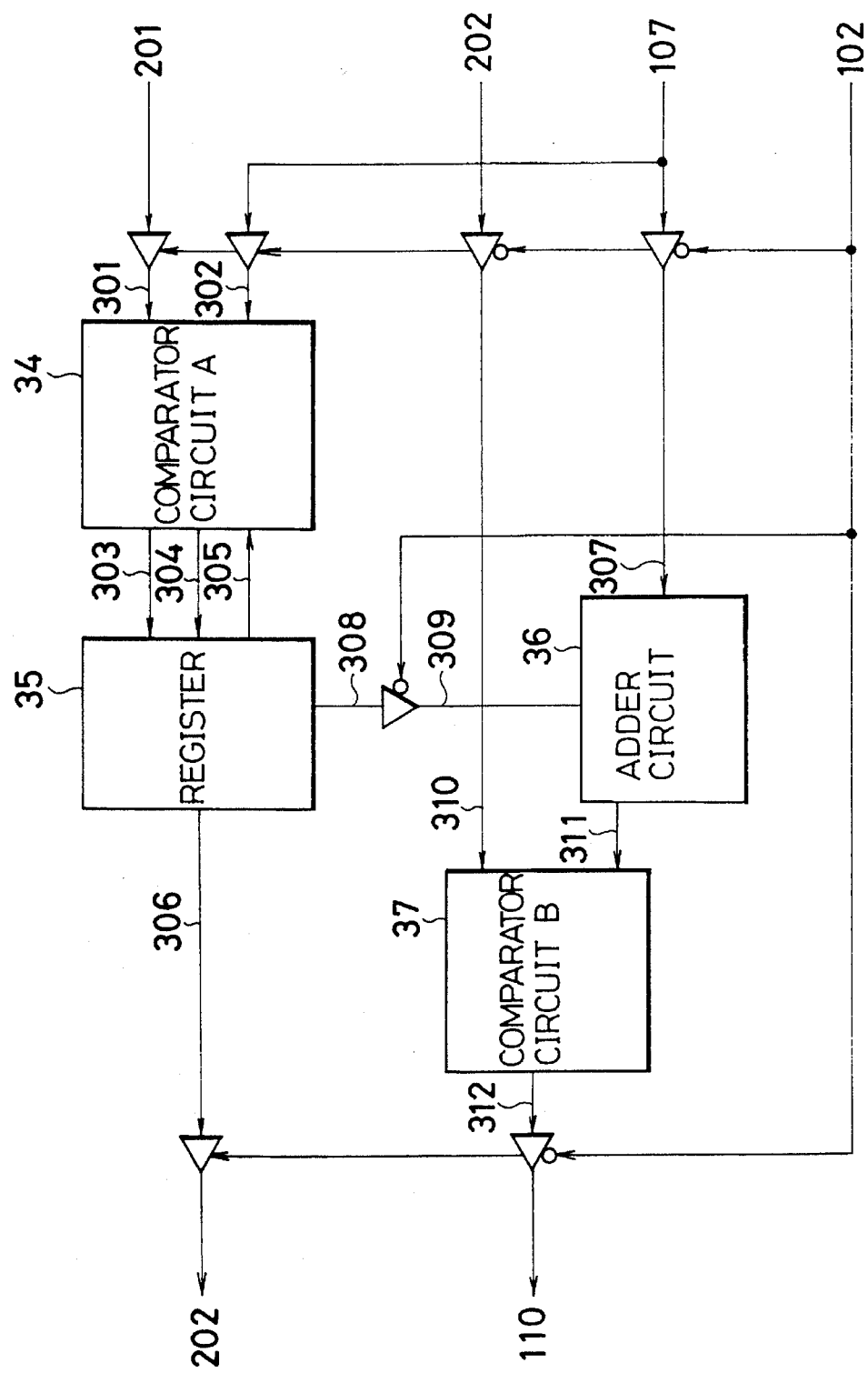
FIG. 12 is a block diagram showing a configuration of the determination circuit 25 in FIG. 10.

FIG. 12 shows a configuration of the determination circuit 25.

The determination circuit 25 consists of a comparator circuit A 34, a register 35, an adder circuit 36, and a comparator circuit B 37.

Figure 13:
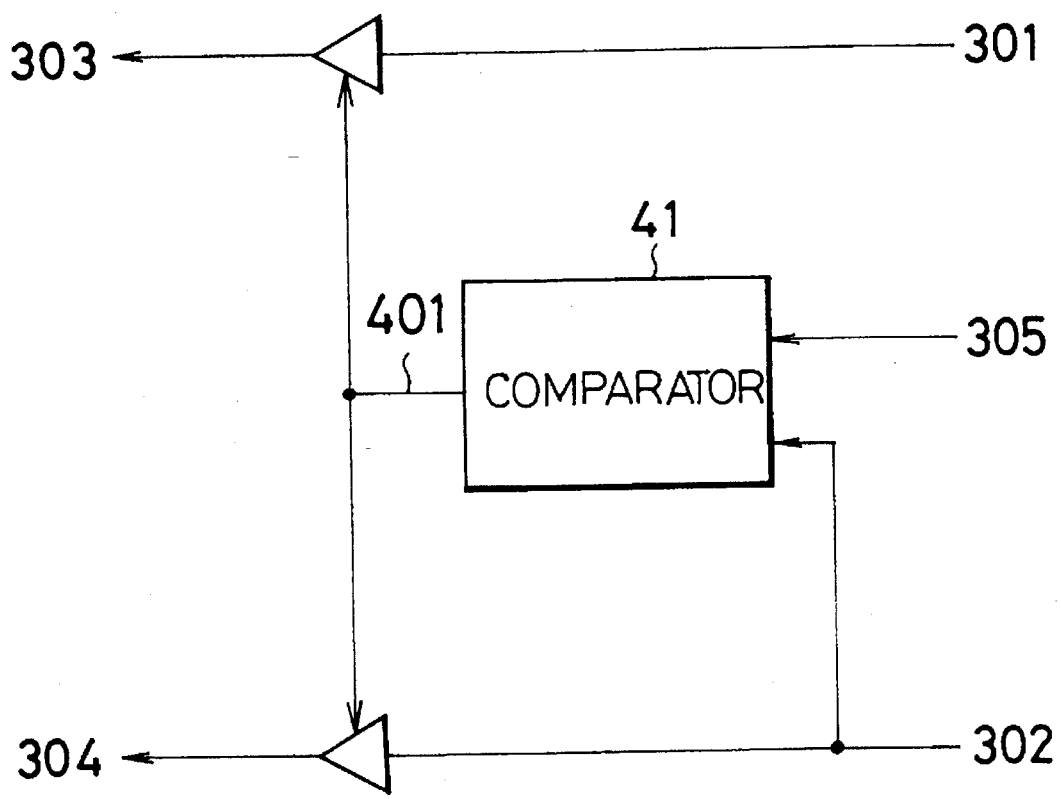
FIG. 13 is a block diagram showing a configuration of the comparator circuit A 34 in FIG. 12.

FIG. 13 shows a configuration of the comparator circuit A 34.

The comparator circuit 34 compares accumulates 302 controlled by the select signal 102 with accumulates 305 stored in the register 35 with a comparator 41, and, if the accumulates 302 is smaller than accumulates 305, outputs the accumulates 302 and a motion vector candidate 301 corresponding to the accumulates 302 as accumulates 303 and a motion vector candidate 304.

Figure 14:
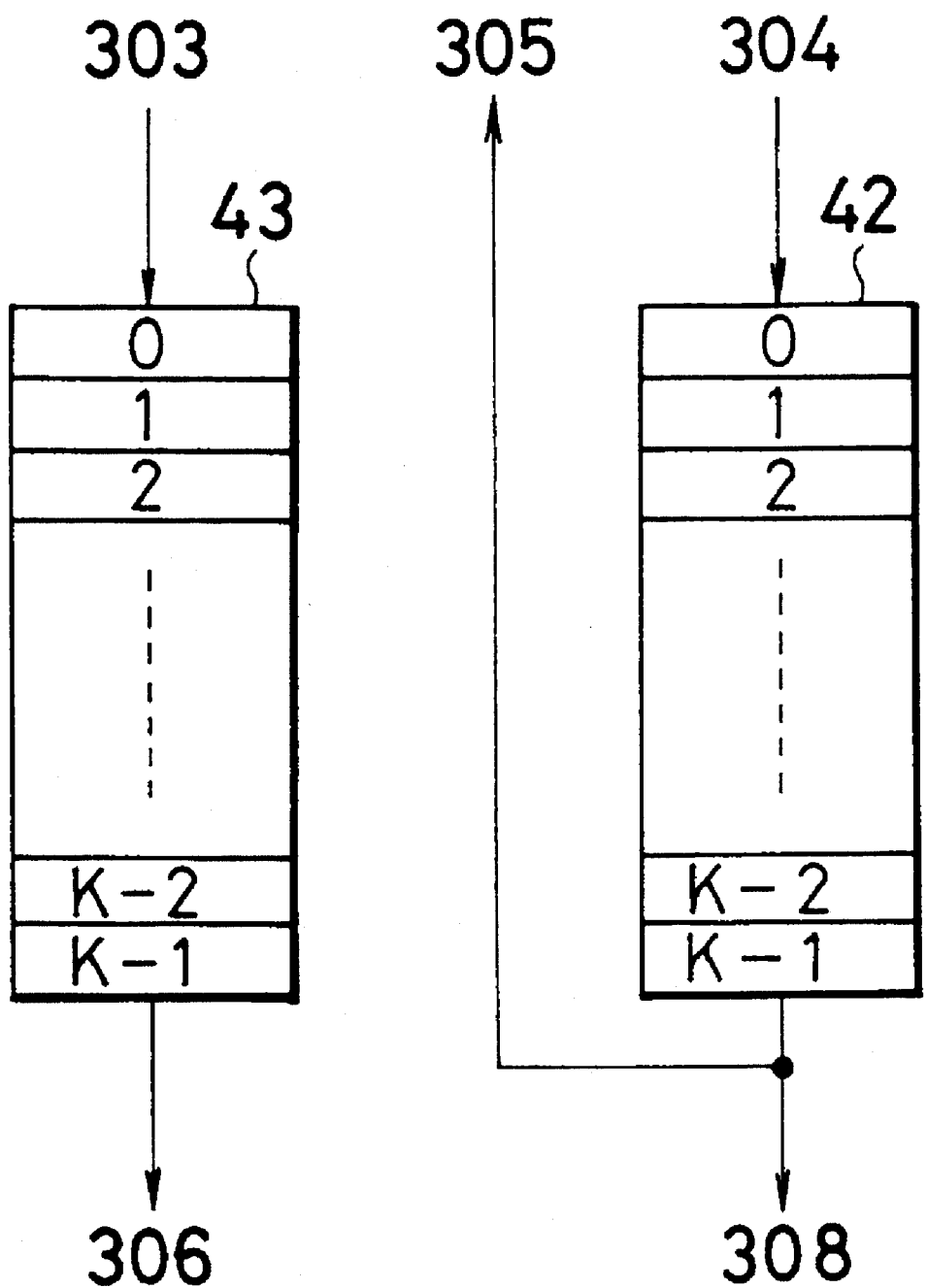
FIG. 14 is a block diagram showing a configuration of the register 35 in FIG. 12.

FIG. 14 shows a configuration of the register 35.

The register 35 stores accumulates 303 and the motion vector candidate 304 input from the comparator circuit A 34 in place of accumulates 305, determined to be larger by the comparison in the comparator circuit A 34, and a corresponding motion vector candidate 306. Then, in response to the select signal 102, K accumulates 308 stored in the register 35 are output as accumulates 309 to the adder circuit, and the motion vector candidate 306 corresponding to each of the accumulates 308 is output as a motion vector candidate 202 to the address generator circuit 24.

The adder circuit 36 adds accumulates 309 with accumulates 307 input by the select signal 102 to obtain total accumulates 311, and outputs them to the comparator circuit B 87.

Figure 15:
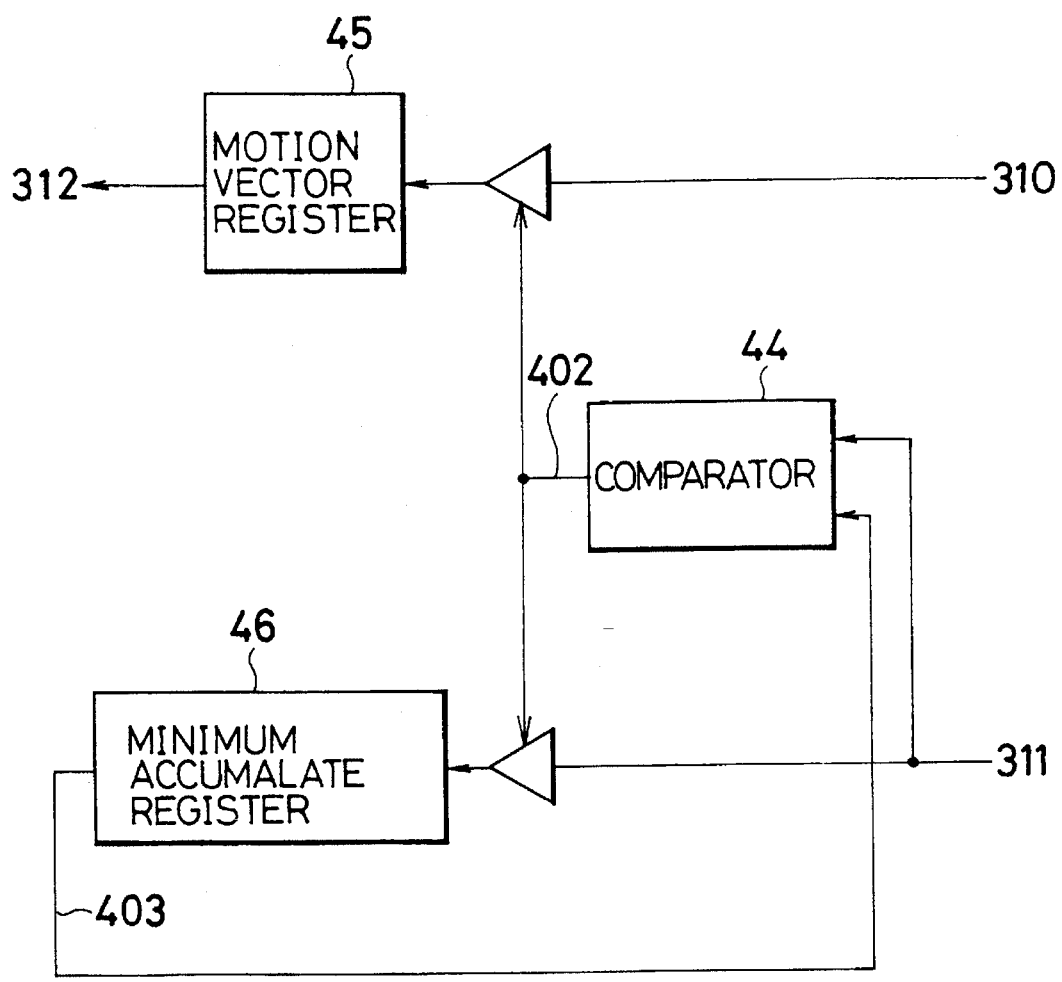
FIG. 15 is a block diagram showing a configuration of the comparator circuit B 37 in FIG. 12.

FIG. 15 shows a configuration of the comparator circuit B 37.

The comparator B 37 compares total accumulates 311 input from the adder circuit 36 with minimum total accumulates 403 stored in a minimum accumulated register 46 with a comparator 44, if the former is smaller than the latter, rewrites contents of the minimum accumulates register 46, rewrites contents of the motion vector register 45 with a motion vector candidate 310 corresponding to rewritten total accumulates 403, and outputs them as a motion vector 312.

Figure 16I:
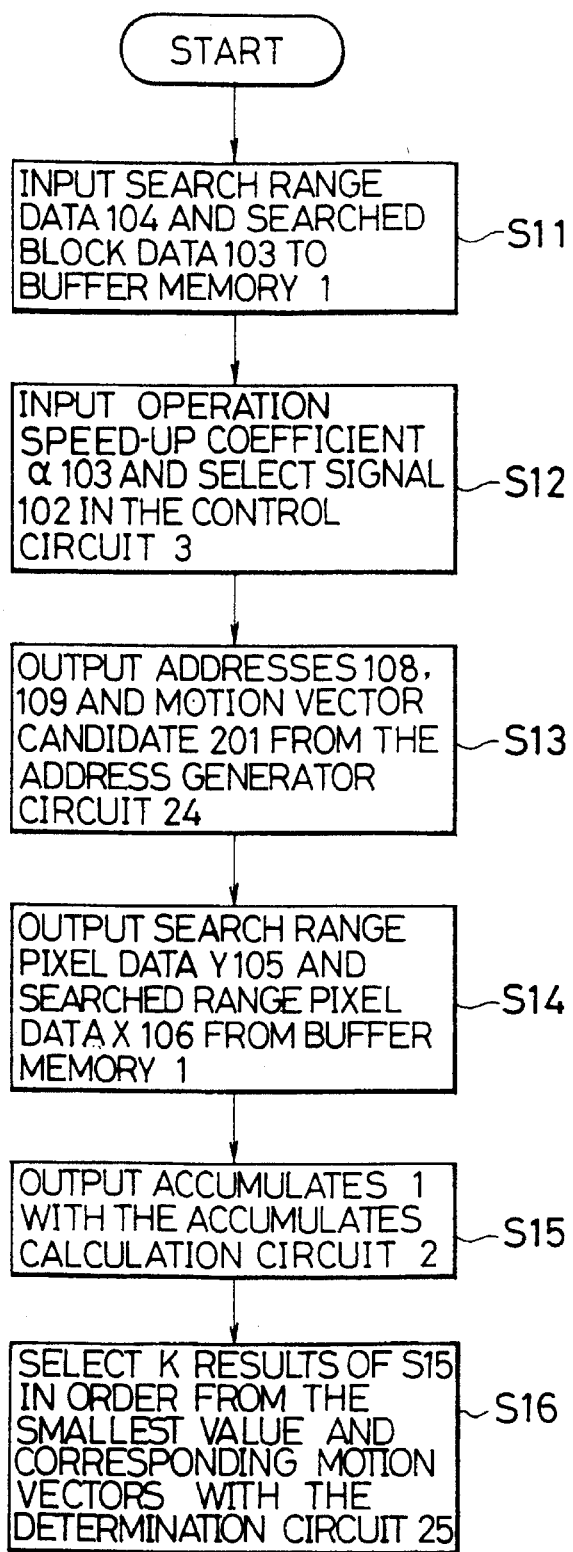
FIG. 16 is a flowchart showing the operation of the detector for a motion vector.
Figure 16:
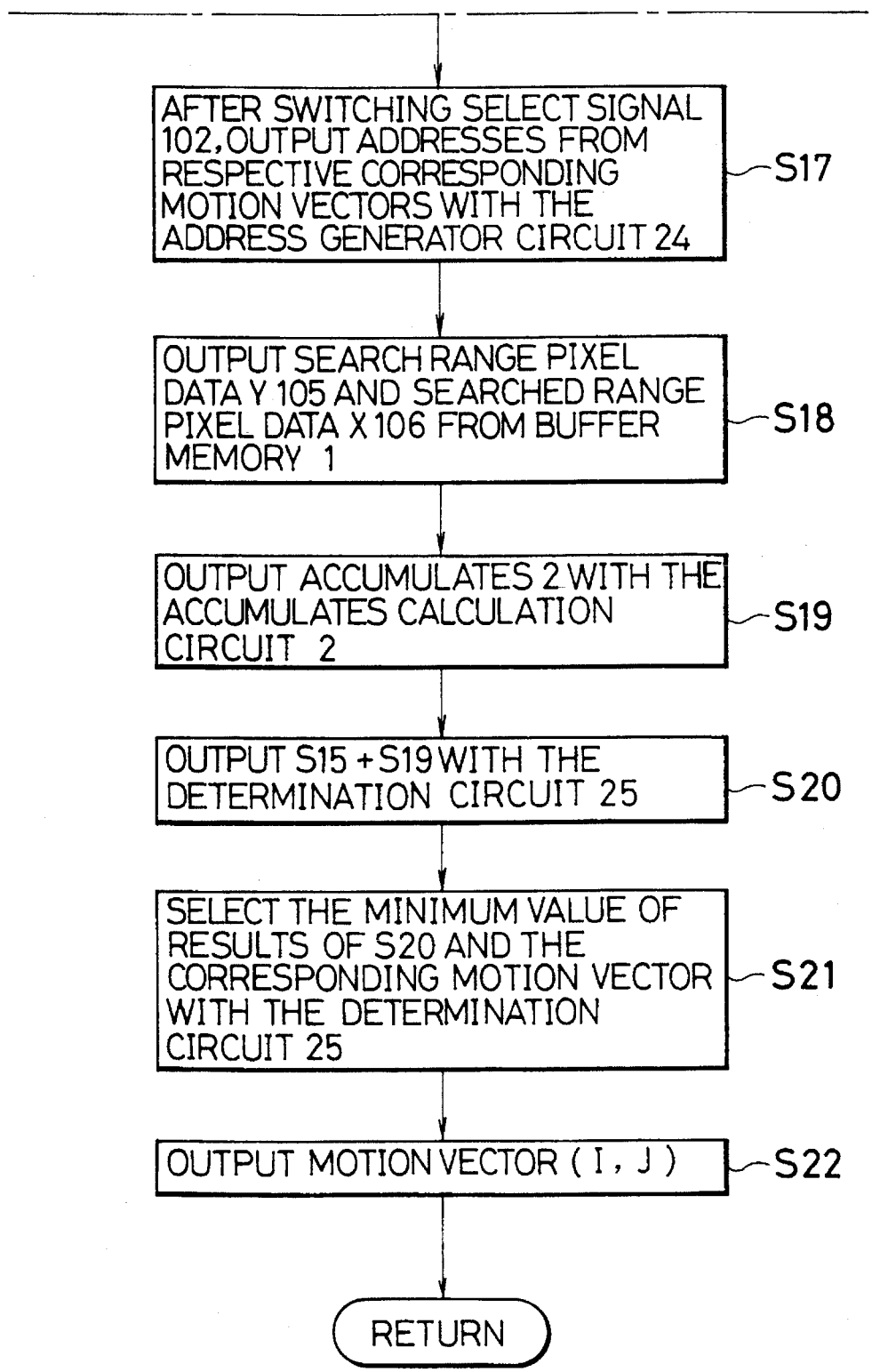

Next, the operation of the motion vector detection process shown in FIG. 7 is described with reference to the flowchart in FIG. 16.

As an example in describing operation, it is assumed that an image to be searched for is divided into small blocks, each consisting of a unit of four 2×2 pixels as shown in FIG. 6, and that a rule for reducing the number of calculations is studied by determining pixels to be calculated for the small block.

Start:

Step S11:

Input searched block data 103 of the input screen (current frame) and search range data 104 of the reference screen (reference frame) to buffer memory 1.

Figure 17A:
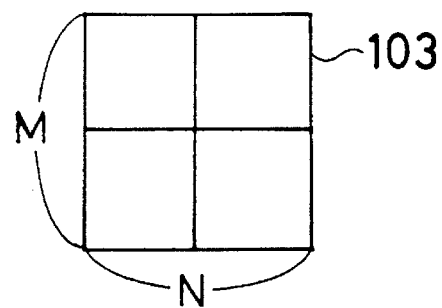
FIGS. 17a and 17b are explanatory views showing example blocks of accumulates calculation.
Figure 17B:
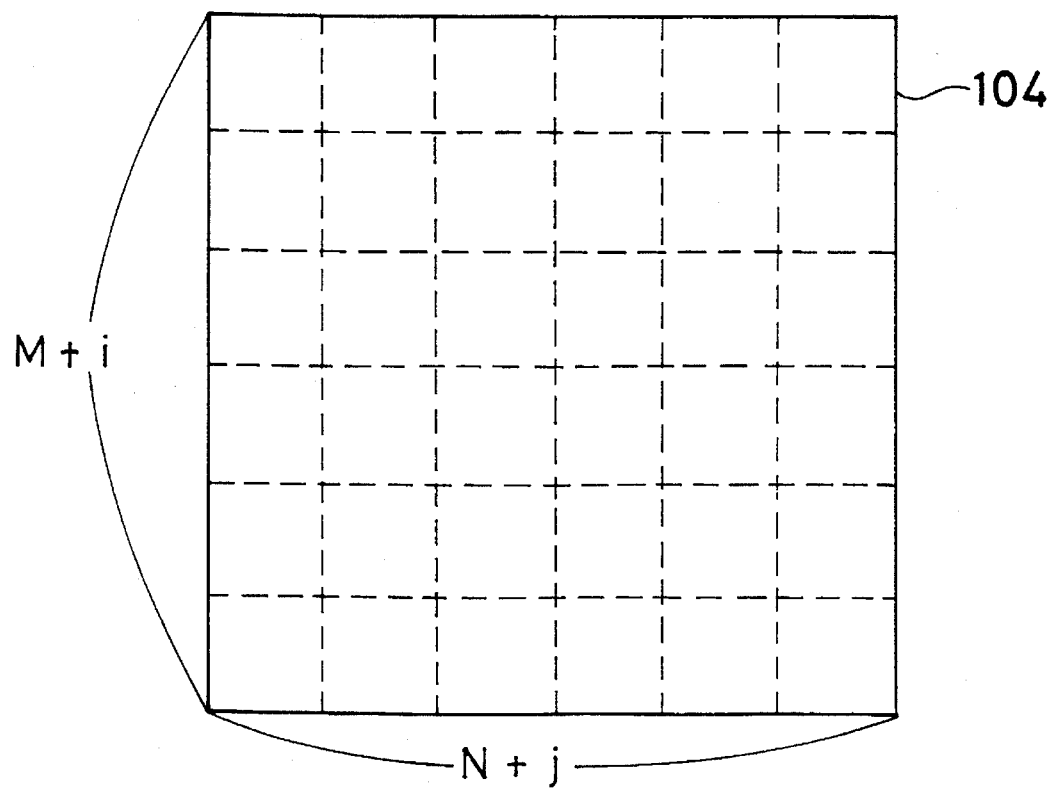

Data of FIG. 17a is assumed as searched block data 103, and data of FIG. 17b where M=2, N=2, and A=2 is assumed as search range data 104 of the reference screen.

Step S12:

Set the operation speed-up coefficient 101 and the select signal S 102.

The operation speed-up coefficient 101 determines the subject to be calculated for the distance as follows.

1) α=1, pixel 1 (A=4)
2) α=2, pixels 1, 2 (A=2)
3) α=3, pixels 1, 3 (A=2)
4) α=4, pixels 1, 4 (A=2)

Here, the operation speed-up coefficient α is set to α=2 for the high-speed operation coefficient A=2.

Step S13:

Output addresses 108, 109 and the motion vector candidate 201 from the address generator circuit 24 by using the operation speed-up coefficient a 101 and the select signal S 102. Since α=2, addresses for even-numbered rows in the block are output.

Step S14:

Input addresses 108, 109 from S13 to buffer memory 1, and output searched range pixel data X 106 and search range pixel data Y 105.

Step S15:

Output accumulates 1 ($D'_{i,j}$) of the following expression (5) from the accumulates calculation circuit 2 by using X and Y of S14:

$$D'_{i,j} = \sum_{m=1}^{M/A} \sum_{n=1}^{N} |X_{Am,n} - Y_{Am+i,n+j}| \tag{5}$$

If A=2 is entered because α=2, it means to calculate even-numbered rows in the block.

Figure 18A:
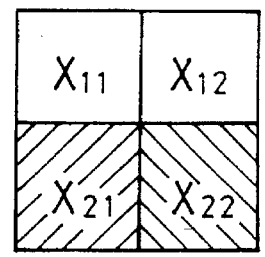
FIGS. 18a and 18b are explanatory views showing data of accumulates 1.
Figure 18B:
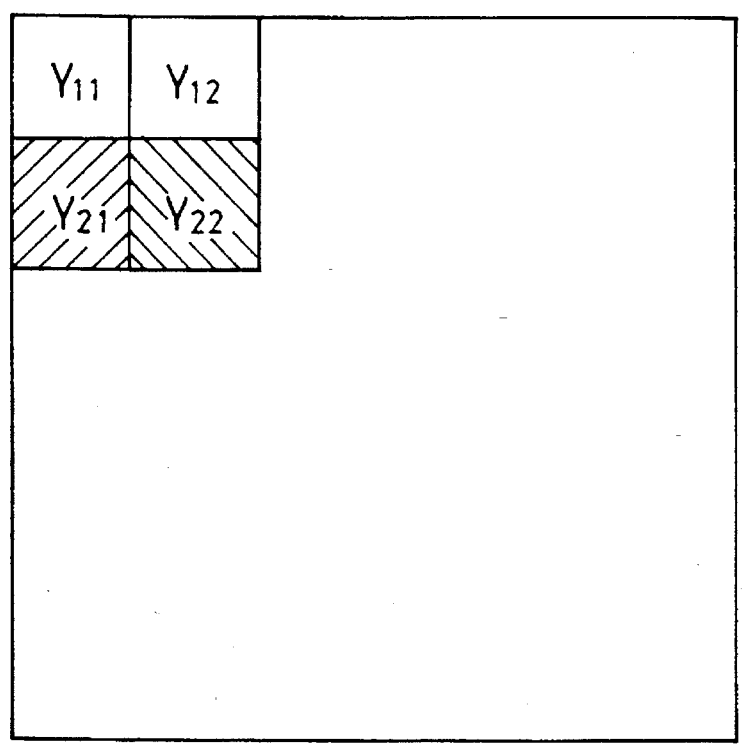
Figure 19A:
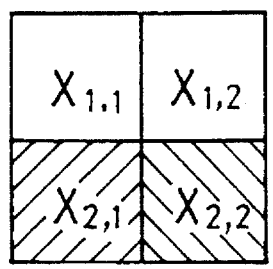
FIGS. 19a and 19b are explanatory views showing another data of accumulates 1.
Figure 19B:
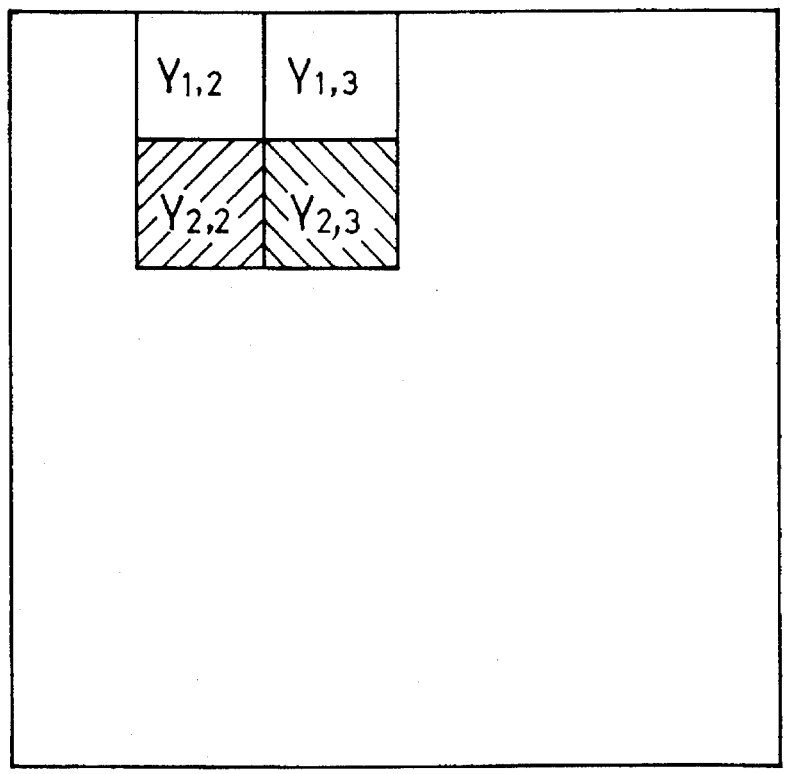

When accumulates 1 is determined from data of FIGS. 17a and 17b, from data of FIGS. 18a and 18b, $D'_{0,0}$ becomes $$D'_{0,0} = |X_{2,1} - Y_{2,1}| + |X_{2,2} - Y_{2,2}|,$$

and from data of FIGS. 19a and 19b, $D'_{0,1}$ becomes $$D'_{0,1} = |X_{2,1} - Y_{2,2}| + |X_{2,2} - Y_{2,1}|.$$

Step S16:

Select K accumulates 1 of step S15 in order from the smallest value from the determination circuit 25 and corresponding K motion vectors, and store them in the register 35.

Step S17:

After switching the select signal S 102, output addresses 108, 109 of odd-numbered rows of the block in the search range, and of the searched range corresponding to K motion vectors selected in S16 from the address generator circuit 24.

Step S18:

Input addresses 108, 109 of S17 to buffer memory 1, and output searched range pixel data X 106 and search range pixel data Y 105.

Step S19:

Output accumulates 2 ($D''_{i,j}$) of the following expression (6) from the accumulates calculation circuit 2 by using X and Y of S18.

$$D''_{i,j} = \sum_{k=2}^{A} \sum_{m=1}^{M/A} \sum_{n=1}^{N} |X_{Am-(k-1),n} - Y_{Am-(k-1)+i,n+j}| \tag{6}$$

If A=2 is entered, it means to calculate the area not calculated in step S15, that is, odd-numbered rows in the block.

Figure 20A:
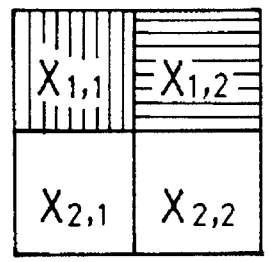
FIGS. 20a and 20b are explanatory views showing data of accumulates 2.
Figure 20B:
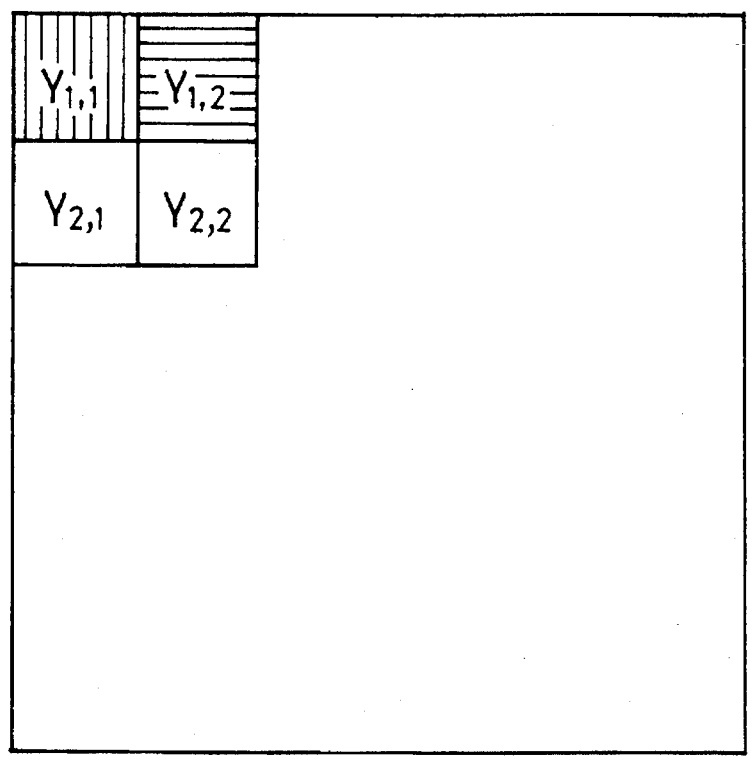
Figure 21A:
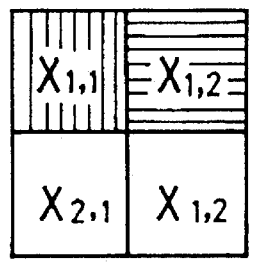
FIGS. 21a and 21b are explanatory views showing another data of accumulates 2.
Figure 21B:
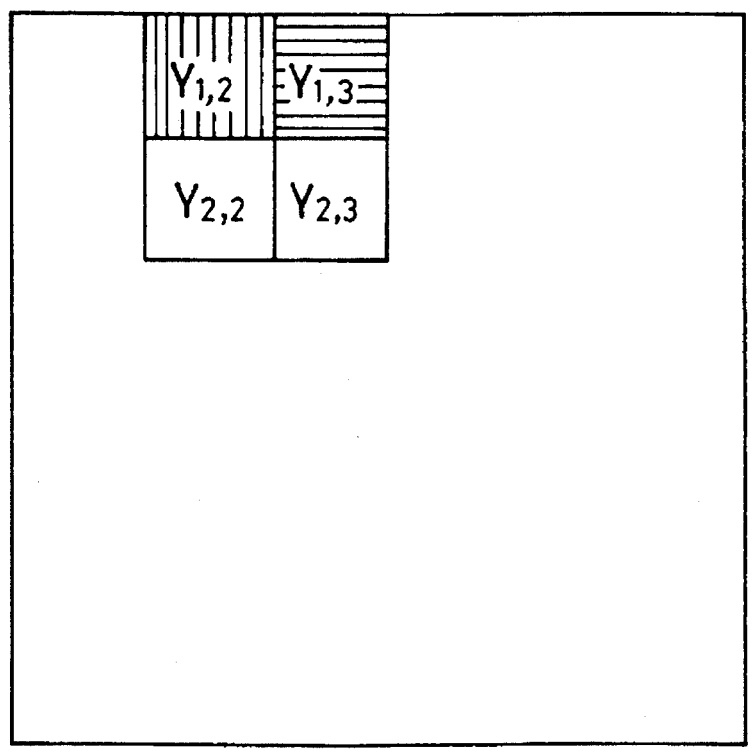

If the accumulate D' is small where, in accumulates 1 determined by data of FIGS. 17a and 17b, K=2, and (i, j)=(0, 0) and (i, j)=(0, 1), the following two accumulates are obtained:

Accumulates 2 of data of FIGS. 20a and 20b, $$D''_{0,0} = |X_{1,1} - Y_{1,1}| + |X_{1,2} - Y_{1,2}|,$$

and Accumulates 2 of data of FIGS. 21a and 21b, $$D''_{0,1} = |X_{1,1} - Y_{1,2}| + |X_{1,2} - Y_{1,3}|.$$

Step 20:

Add accumulates 1 of step SiS and accumulates 2 of step 19, both stored in the register 35 with the determination circuit 25, and output the total accumulates D of the following expression (7):

$$D = D'_{i,j} + D''_{i,j} \tag{7}$$

In the example in FIGS. 17a and 17b, the sum of the following two is obtained:

$$D_{(0,0)} = D'_{(0,0)} + D''_{(0,0)}, \text{ and}$$

$$D_{(0,1)} = D'_{(0,1)} + D''_{(0,1)}.$$

Step S21:

Select the minimum value of total accumulates of step S20 and the motion vector (i, j) corresponding to it with the determination circuit 25.

In the above example, if $D_{(0,0)} > D_{(0,1)}$, the corresponding motion vector is (0, 1).

Step S22:

Output the motion vector (i, j).

Return:

Therefore, where the input pixel block is M×N pixels, the search range is L, the high-speed operation coefficient is A, and the number of motion vector candidates at the first accumulate calculation is K, the amount of calculation is:

$$\{L \times (1/A) \times M \times N\} + [(A-1) \times K \times \{1-(1/A)\} \times M \times N]35 = (M \times N)/A \times \{L+K \times (A-1)^2\}$$

Thus, it is less than the amount of conventional calculation, L×M×N.

Many widely different embodiments of the present invention may be constructed without departing from the spirit and scope of the present invention. It should be understood that the present invention is not limited to the specific embodiments described in the specification, except as defined in the appended claims.

What is claimed is:

1. An apparatus for detecting a motion vector of a moving picture, comprising:

a first storing means for storing a pixel block of a current frame and a corresponding pixel block of a reference frame;

a processing means connected to said first storing means for deriving a first partial accumulates between pixels of said stored pixel block of said current frame and corresponding pixels of said reference frame and for storing said first partial accumulates;

a first selecting means connected to said processor means for selecting a predetermined number of said stored first partial accumulates in said processor means in order from the smallest value;

a second storing means connected to said first storing means and said first selecting means for storing said selected first partial accumulates and spatial locations corresponding to said selected first partial accumulates, said processing means deriving a second partial accumulates between pixels of said selected first partial accumulates stored in said second storing means and corresponding pixels of said reference frame stored in said first storing means, and said processing means storing said second partial accumulates;

an adding means connected to said processing means and said second memory means for adding said selected first partial accumulates stored in said second storing means and said second partial accumulates stored in said processing means thereby to get total accumulates; and a second selecting means connected to said adding means for selecting a minimum one from said total accumulates and assuming a spatial location of said selected total accumulate as a motion vector.

2. An apparatus according to claim 1, wherein said processing means derives said first partial accumulates with respect to one of odd or even lines, and derives said second partial accumulates with respect to the other lines.

3. An apparatus according to claim 1, wherein said processing means derives said first partial accumulates with respect to one of odd or even columns, and derives said second partial accumulates with respect to the other columns.

4. An apparatus according to claim 1, wherein said processing means derives said first partial accumulates with respect to one of odd or even diagonal lines, and derives said second partial accumulates with respect to the other diagonal lines.

5. An apparatus according to claim 1, wherein said processing means derives said first partial accumulates and said second partial accumulates by using a high-speed operation coefficient to reduce the number of calculation of said first partial accumulates and said second partial accumulates.

6. An apparatus according to claim 5, wherein said high-speed operation coefficient is 2.

7. A method for detecting a motion vector of a moving picture, comprising the steps of:

deriving a first partial accumulates between pixels of a pixel block of a current frame and corresponding one of a reference frame;

selecting predetermined number of said first partial accumulates in order from the smallest value;

deriving a second partial accumulates between pixels of said selected first partial accumulates and corresponding pixels of said reference frame;

adding said selected first partial accumulates and second partial accumulates to get total accumulates; and selecting a minimum one from said total accumulates and assuming a spatial location of said selected total accumulate as a motion vector.

8. A method according to claim 7, wherein said step of deriving said first partial accumulates derives said first partial accumulates with respect to one of odd or even lines, and said step of deriving said second partial accumulates derives said second partial accumulates with respect to the other lines.

9. A method according to claim 7, wherein said step of deriving said first partial accumulates derives said first partial accumulates with respect to one of odd or even columns, and said step of deriving said second partial accumulates derives said second partial accumulates with respect to the other columns.

10. A method according to claim 7, wherein said step of deriving said first partial accumulates derives said first partial accumulates with respect to one of odd or even diagonal lines, and said step of deriving said second partial accumulates derives said second partial accumulates with respect to the other diagonal lines.

11. A method according to claim 7, wherein each of steps of deriving said first partial accumulates and deriving said second partial accumulates uses a high-speed operation coefficient to reduce the number of calculation of said first partial accumulates and said second partial accumulates.

12. A method according to claim 11, wherein said high-speed operation coefficient is 2.

* * * * *